United States Patent [19]

Davey et al.

[11] 3,917,930

[45] Nov. 4, 1975

[54] METHOD AND APPARATUS FOR ADAPTIVELY POSITIONING A MACHINE ELEMENT

[75] Inventors: James Andrew Davey, Villa Hills, Ky.; Charles B. Perry, Cincinnati, Ohio; Harvey William Rohmiller, Covington, Ky.

[73] Assignee: Cincinnati Milacron Inc., Cincinnati, Ohio

[22] Filed: Nov. 25, 1974

[21] Appl. No.: 526,584

[52] U.S. Cl. ........... 235/151.11; 318/632; 318/569; 235/150.1
[51] Int. Cl.² ........................................ G05B 13/02
[58] Field of Search ................................ 235/151.11

[56] References Cited
UNITED STATES PATENTS

| | | | |
|---|---|---|---|
| 3,269,233 | 8/1966 | Lothmann | 235/151.11 |
| 3,353,161 | 11/1967 | Toscano | 235/151.11 X |
| 3,555,252 | 1/1971 | Garden | 235/151.1 |
| 3,555,254 | 1/1971 | Gerber | 235/151.11 |
| 3,612,840 | 10/1971 | Stobbe | 235/151.11 |
| 3,852,719 | 9/1973 | Nishumura | 235/151.11 |

Primary Examiner—Eugene G. Botz
Attorney, Agent, or Firm—C. Richard Eby

[57] ABSTRACT

A method and apparatus is disclosed for use with a drive system iteratively moving a machine element through a positioning cycle in response to input signals defining each of the positions in the cycle. During an initial application of each of the input signals, compensation values corresponding to the input signals are produced and stored. Each compensation value represents the difference between the desired position as defined by the input signal and the actual final position as determined by a measuring circuit. During a subsequent application of each of the input signals, they are modified by a corresponding compensation value thereby causing the actual final position of the machine element to more closely coincide with the desired position.

14 Claims, 2 Drawing Figures

METHOD AND APPARATUS FOR ADAPTIVELY POSITIONING A MACHINE ELEMENT

BACKGROUND OF THE INVENTION

Generally, the invention relates to the area of control devices, e.g. numerical controls, machine controls, etc., which are operable in response to programmed information to move one or more controlled elements on a machine along a programmed path. The programmed path is defined by a successive number of blocks of programmed information. The programmed information is represented by input signals defining a number of positioning end points. Further, the programmed blocks of information may be executed in a continuous or non-continuous manner. Specifically, the invention provides an apparatus for improving the accuracy with which the controlled elements are moved to the programmed positions corresponding to the input signals.

The disclosed invention is particularly useful on devices that do not have a closed loop servomechanism. In an effort to reduce costs, many control devices have been developed which are open loop in nature. However, because of inherent problems in maintaining positioning accuracy without an active feedback loop, many techniques and circuits have been devised for improving the positioning accuracy in an open loop system. A popular technique for improving accuracy is to generate either a series of slow down spans or to otherwise provide a deceleration as the controlled element approaches a commanded end point or change in path direction. There are several disadvantages to this approach. First, there is the obvious increase in cost and complexity of the system which will tend to decrease its reliability. Second, normally the above technique provides a fixed cycle for every span along the programmed path. However, the accuracy of any controlled element position is a function of many variables, e.g. machine dynamics, the cutting process, environmental conditions, etc.; therefore, a fixed slow-down cycle must be compromised to account for all possible conditions. Third, because the slow down span is executed at a constant low velocity, the time required to execute each move is increased. Consequently, the efficiency in moving the controlled element is reduced.

To improve on the above technique, some control devices have apparatus for measuring position errors and using this measured error in a corrective manner. In one case, the measured position error is added to an immediately subsequent programmed span. This does not allow the position errors to accumulate. However, this does nothing to correct the accuracy in the span in which the error originated. In another case, after the execution of a programmed span, the measured error is presented to a drive mechanism; and the controlled element then moves to a more accurate final position. Unfortunately, in many applications this type of positioning cycle is impractical. For example, when executing a cutting operation, it is meaningless to overshoot an end point and then correct for it.

The prior art contains another technique for improving the accuracy with which a controlled element executes a programmed path. In this system, a plurality of adjustable switches may be selected at the option of a programmer to be effective during particular programmed spans. The operator measures the position error and sets an appropriate switch to this amount. Therefore, in subsequent executions of the particular span, the measured error compensates the commanded position; however, there are several disadvantages to this system. First, it requires the operator to intervene in the process, measure the error and set the switches. This operation is unnecessarily time consuming and reduces the productive output of the machine. Second, it is impractical to compensate every positioning span. Finally, the system is fixed. It does not adapt to changes which occur during subsequent machining cycles.

As mentioned earlier, the final position of the controlled element will vary as a function of several variables or error producing conditions. These variables may be divided into two general groups. The first group will be referred to as random errors, and the second group will be referred to as long term errors. Random errors may or may not occur during a given programmed span. Further, random errors may be caused by changes in the electrical and hydraulic valves, hydraulic pressure variations or line voltage variations causing changes in actuator response, the relative position of the element in the dead band of the measuring circuit, changes in the machinability of the workpiece material, etc. Long term errors may be caused by temperature variations in the machine and its hydraulic system (if used), tool wear that changes the cutter feed force, changes in the hydraulic lubricating film between moving surfaces, long term wear of machine elements, etc.

In measuring the difference between the desired position and the actual final position of the controlled element, it is impractical to attempt to allocate portions of the position error to random error conditions and long term error conditions. Therefore, initially one may decide to ignore the unpredictable nature of the random errors and compensate a subsequent occurrence of an input signal by the whole position error measured during a previous application of the input signal. However, because random errors may change direction from one cycle of operation to the next, this compensation strategy may result in a net growth of position error with each successive cycle of operation. To overcome this problem, in applicants' preferred embodiment, changes in compensation are made on a fixed incremental basis as a function of the sign of the current position error. This embodiment allows the system to respond to gradual changes in the long term error conditions but reduces the system response to the short term random error conditions.

Applicants' disclose a system which is free of the disadvantages discussed with reference to the systems in the prior art. Applicants' apparatus continuously compensates on a span by span basis for error conditions which change the machine dynamics over a long term. Further, although slow down spans may be used with applicants' apparatus, they are not anticipated in the preferred embodiment. Consequently, applicants provide an open loop system which always moves at a constant feed rate and in which the positioning accuracy is optimized.

SUMMARY OF THE INVENTION

According to one embodiment of the invention, an apparatus is claimed which is operable with an actuator control circuit for commanding an actuator to move a controlled element connected thereto in response to an input signal representing a programmed increment of motion. The controlled element is connected to a measuring circuit for producing an output signal representing the actual position achieved by the element in response to the input signal. The apparatus contains a storage means for storing compensation signals. Said storage means includes means for generating an initial compensation signal. Further, means are responsive to the input signal and the initial compensation signal for algebraically adding said signals to produce a command signal. A comparator circuit has inputs responsive to the command signal and the output signal for producing to the actuator control circuit a motion signal in response to a nonzero difference between the inputs and a stop signal when said inputs are equal. Further, means are responsive to the output signal and the input signal for producing a measured compensation signal representing the difference between the desired position of the controlled element and the actual final position of said element. Finally, means are provided which are responsive to the initial compensation signal and the measured compensation signal for modifying the initial compensation signal as a function of the measured compensation signal to produce a new compensation signal. Said modifying means is further operative to load the new compensation signal in the storage means in place of the initial compensation signal, and said new compensation signal is operative during a subsequent occurrence of the input signal. The apparatus operates iteratively to modify each subsequent occurrence of the input signal by a previously calculated new cmpensation signal.

DESCRIPTION OF THE PREFERRED EMBODIMENT

Figure 1:
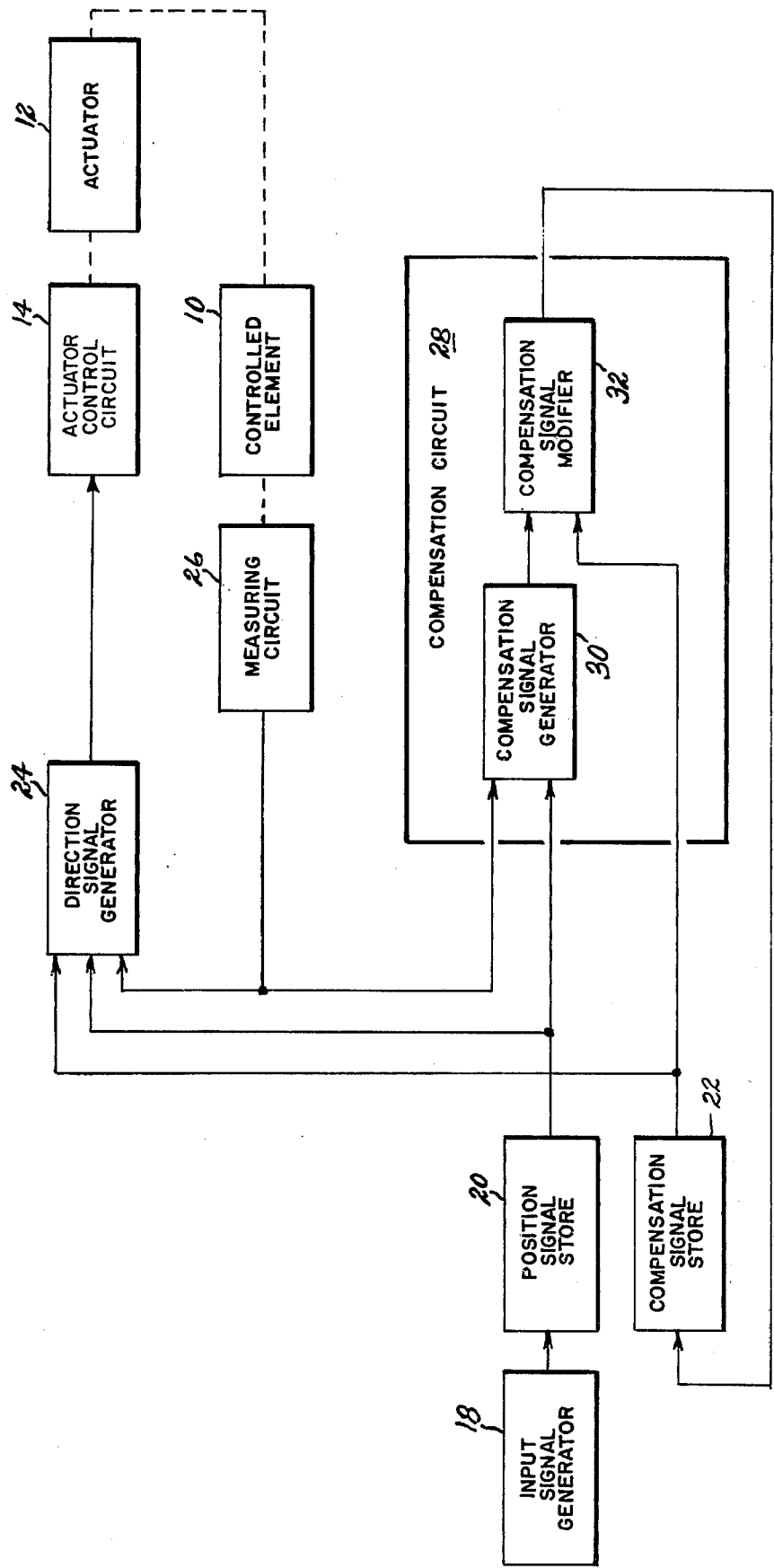
FIG. 1 is a general block diagram illustrating basic components of the adaptive dynamic compensation circuit.

FIG. 1 is a general block diagram illustrating applicants' invention. Application of the invention is only limited by the necessity of three elements. These elements are a controlled element 10, an actuator 12 and an actuator drive 14. The drive apparatus can be of any nature, e.g. hydraulic, pneumatic, electric, etc. Further, the controlled element may be one or more elements which are responsive to the actuators 12 and actuator drive 14.

An input signal generator 18 provides input signals to a position signal store 20. The input signal generator may provide input signals from a stored medium or they may be manually input via the keyboard. Each input signal defines a position to which the controlled element is to be moved. The input signals are stored in a position signal store 20. The compensation signal store 22 contains storage locations for a number of compensation signals corresponding to the number of input signals. The compensation signal store may also have an initial compensation signal generator associated therewith for determining an initial compensation signal value. The initial compensation signal may be zero. However, in some situations, this assumption will generate a large error signal; therefore, a nonzero initial compensation signal is preferred. After the initial compensation signal is utilized one time, the apparatus is operative to calculate a new compensation signal.

In operation, a first input signal and a corresponding first compensation signal are transferred from the position signal store 20 and compensation signal store 22 to a direction signal generator 24. A command signal is generated to move the controlled element to a position defined by the input signal. After the controlled element has achieved its final position in response to the first input signal, a new compensation signal is generated and is transferred to the compensation signal store to the storage location corresponding to the first compensation signal. Therefore, during the next cycle of operation and in response to the next occurrence of the first input signal, the new compensation signal will be combined with the first input signal thereby causing the controlled element to move to a final position more closely corresponding to the position defined by the first input signal.

Within the direction signal generator 24, the first input signal is algebraically summed with a previously determined compensation signal to produce a command signal. The command signal is compared with an output signal from the measuring circuit 26. The measuring circuit 26 is in mechanical communication with the controlled element 10 and is operative to produce an output signal representing the position of the movable element. Typically, the measuring circuit may be comprised of a transducer providing a digital output signal and a bidirectional counter.

Upon the generation of the command signal, the direction signal generator detects a nonzero difference magnitude between the command signal and the output signal and produces a motion signal to the actuator control circuit 14. The motion signal defines the direction of motion of the controlled element to cause the element to achieve the position represented by the command signal. The actuator control circuit responds to the motion signal by causing the actuator 12 to move the controlled element in the appropriate direction at a predetermined velocity. During the slide motion, the direction signal generator continues to compare the command signal with the output signal. When the output signal equals the command signal, the direction signal generator responds to this zero difference by terminating the motion signal, i.e. producing a stop signal to the actuator control circuit 14. The actuator control circuit immediately terminates the operation of the actuator 12; and thereafter, the controlled element comes to a stop.

Within a compensation circuit 28, a compensation signal generator 30 has inputs responsive to the input signal and the output signal. The compensation signal generator 30 determines the difference between the desired position of the controlled element and its actual final position. The difference is represented by a measured compensation signal produced by the generator 30. Within a compensation signal modifier circuit 32, a new compensation signal is produced by modifying the previously determined compensation signal as a function of the measured compensation signal. The new compensation signal is then transferred to the compensation signal store in place of the previously determined compensation signal. Therefore, during the next occurrence of the input signal, the new compensation signal will operate as a previously determined compensation signal and will be algebraically summed with the input signal in the direction signal generator.

A compensation signal is generated for each of the input signals and is repeated during each cycle of occurrence of the input signals. Therefore, the actual final position of the slide can be made to closely correspond to the desired position. Further, changes in response of the system due to long term conditions as earlier defined can be corrected.

Figure 2:
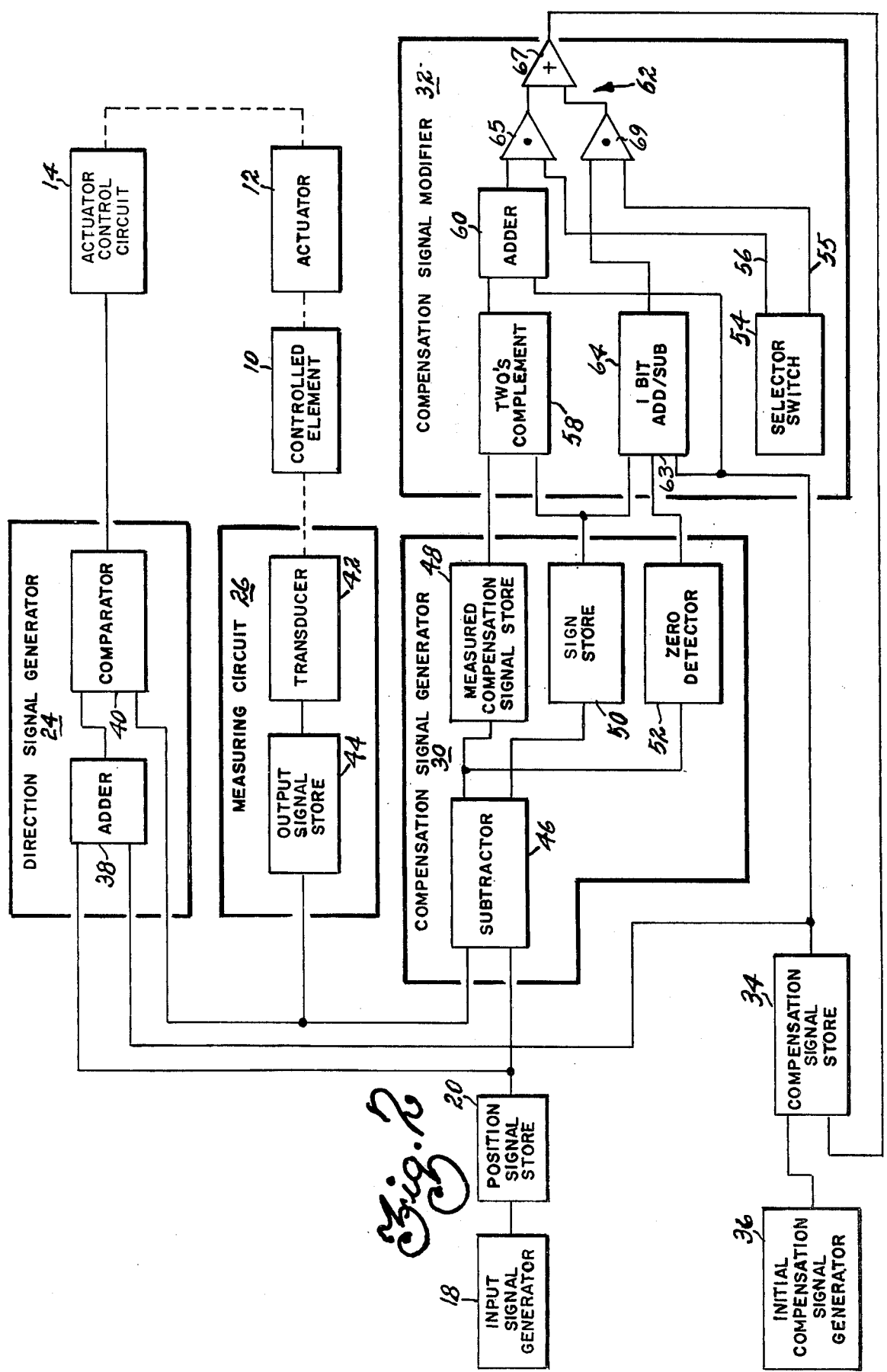
FIG. 2 is a detailed block diagram illustrating the preferred embodiment of applicants' invention.

FIG. 2 is a detailed block diagram of applicants' invention. A compensation signal store 34 contains a number of storage locations corresponding to the number of input signals desired to be compensated. Associated with the store 34 is an initial compensation signal generator 36. The initial compensation signal generator may be comprised of a single reset switch which causes a zero compensation signal to be input to all of the storage locations in the compensation signal store 34. In the alternative, the generator 36 may be comprised of circuitry for addressing each of the storage locations in the store 34 for loading therein an initial compensation signal of a predetermined magnitude.

Within the direction signal generator 24, an adder circuit 38 is responsive to a first input signal and a corresponding previously determined compensation signal. The adder is operative to algebraically add these signals and provide a command signal on an output connected to a comparator circuit 40. The comparator has another input connected to the measuring circuit 26 comprised of a transducer 42 and output signal store 44. The comparator produces a motion signal to the actuator control circuit 14 in response to a nonzero difference magnitude between the command signal and an output signal. However, as the actuator moves the controlled element 10 in the appropriate direction, the difference between the command signal and the output signal becomes smaller; and the comarator 40 will terminate the motion signal or produce a stop signal in response to a zero difference magnitude between the command signal and the output signal.

At this point, it should be remembered that the previously determined compensation signal may be modified in a number of ways in response to a subsequent positioning error. As mentioned earlier, random errors may change direction from one cycle to another; and therefore, one may not wish to change a previously determined compensation signal by the full amount of positioning error detected. However, to set up the system and determine an initial compensation signal, the initial compensation signal may be made equal to the full amount of position error detected. This is the approach used in applicants' preferred embodiment.

Within the compensation signal generator 30, a subtracter circuit 46 is responsive to the measuring circuit 26 which produces an output signal representing the actual final position of the controlled element; and the subtracter circuit 46 is also responsive to the first input signal from the position signal store 20. The magnitude of the difference between the first input signal and its corresponding output signal is stored in a measured compensation signal store 48, and the sign of the difference is stored in a sign store 50. Further, a zero detection circuit 52 is responsive to the magnitude of the difference between the final value of the output signal and the input signal to detect when these signals are equal. Obviously, when the signals are equal, the previously determined compensation signal is optimized, and further modification is unnecessary.

Within the compensation signal modifier 32, a selector switch 54 is operative to produce an automatic mode signal on the line 55 and a nonautomatic mode signal on the line 56. The automatic mode signal corresponds to a condition in which the apparatus is operating in a working mode. In other words, if the apparatus is used on the machine tool, material would be removed from a workpiece in response to a cyclic occurrence of the input signals. The non-automatic mode is anticipated as a set-up mode in which the controlled element moves in response to the input signals, but no other function occurs.

As discussed earlier, in the non-automatic mode, the total positioning error is used to modify the previously determined compensation signal. Consequently, a twos complement circuit 58 is responsive to the sign store 50 and the measured compensation signal store 48 for producing a signal having the appropriate sign. An adder circuit 60 is responsive to the twos complement circuit and the previously determined compensation signal from the signal store 34. The measured compensation signal is algebraically added to the previously determined compensation signal in the adder 60 to produce a first new compensation signal. A gating network 62 is responsive to the non-automatic mode signal to load the first new compensation signal in the compensation signal store 34 in place of the previously determined compensation signal.

If the apparatus is operating in the automatic mode, the previously determined compensation signal may be modified by a fixed percentage of the measured compensation signal or by a predetermined incremental magnitude as a function of the measured compensation signal. In applicants' preferred embodiment, the latter modification technique is used. A one bit adder-subtracter circuit 64 is responsive to the previously determined compensation signal and changes said signal by a predetermined incremental magnitude as a function of the signal from the sign store 50. Consequently, the adder-subtracter 64 produces a second new compensation signal which is larger or smaller by a fixed increment than the previously determined compensation signal. The process continues until the zero detector 52 detects a zero magnitude of the measured compensation signal. Upon detecting a zero magnitude, the zero detector produces a signal to the inhibit input 63 of the one bit adder/subtractor 64 thereby terminating its operation. The gating network 62 is responsive to the automatic mode signal on line 55 for loading the second new compensation signal into the compensation signal store 34 in place of the previously determined compensation signal.

Therefore, when in the automatic mode, the system response is limited to a maximum predetermined incremental magnitude. This results in the system compensating for long term error conditions which occur over a number of positioning cycles. In contrast, the direction, magnitude and timing of random errors is totally unpredictable. By limiting the compensation to an incremental magnitude during a single positioning cycle, the impact of random error conditions is minimized; and the controlled element will achieve an actual final position which closely corresponds to the desired position as defined by the input signal.

Two points should be noted at this time. First, the invention is applicable regardless of the number of input signals one desires to compensate. Further, either one or a plurality of input signals or selected ones of a plurality of input signals may be compensated in a similar manner. Further, the changes required to accomodate a selected plurality of input signals would be obvious to those who are skilled in the art. Second, it is also obvious to those who are skilled in the art that the compensation may be calculated once, any predetermined number of times, at predetermined time intervals, or in response to a randomly occurring signal, e.g. a signal indicating an excessive magnitude of position error or some other process condition.

While the invention has been illustrated in some detail according to the preferred embodiments shown in the accompanying drawings, and while the preferred illustrated embodiments have been described in some detail, there is no intention to limit the invention to such detail. On the contrary, it is intended to cover all modifications, alterations and equivalents falling within the spirit and scope of the appended claims.

What we claim is:

1. An apparatus for iteratively modifying input signals representing desired changes of positions of a controlled element as a function of position errors generated during previous occurrences of said input signals, said apparatus being operative with an actuator control circuit for commanding an actuator to move the controlled element through cycles of positioning motions in response to the cyclic occurrence of the input signals, said controlled element being connected to a measuring circuit for producing an output signal representing the actual position of the controlled element, the apparatus comprising:
   a. storage means for storing compensation signals, said storage means including means for producing initial compensation signals;
   b. means having one input responsive to the input signals and a second input connected to the storage means for producing command signals, each command signal representing the algebraic sum of an input signal and a corresponding previously determined compensation signal;
   c. means having inputs responsive to the command signals and the measuring circuit and having an output connected to the actuator control circuit for producing
      1. a motion signal in response to a non-zero difference between a command signal and a corresponding output signal, and
      2. a stop signal in response to a zero difference between the command signal and the corresponding output signal;
   d. means repsonsive to the input signals and the output signals for producing measured compensation signals, each measured compensation signal representing the difference between the desired position of the element and the actual final position of said element; and
   e. means responsive to the measured compensation signals and the previously determined compensation signals and connected to the storage means for producing new compensation signals and loading said new compensation signals in the storage means in place of the corresponding previously determined compensation signals whereby said new compensation signals operate as the previously determined compensation signals during a subsequent occurrence of the input signals.

2. An apparatus for iteratively compensating input signals representing desired changes of position of a controlled element as a function of position errors generated during previous occurrences of said input signals, said apparatus being operative with an actuator control circuit for commanding an actuator to move the controlled element through cycles of positioning motions in response to the cyclic occurrence of the input signals, said controlled element being connected to a measuring circuit for producing an output signal representing the actual position of the controlled element, the apparatus comprising:
   a. storage means for storing compensation signals, said storage means including means for producing initial compensation signals;
   b. means having one input responsive to an input signal and a second input connected to the storage means for producing a command signal representing the algebraic sum of the input signal and a previously determined compensation signal;
   c. means having inputs responsive to the command signal and an output signal and having an output connected to the actuator control circuit for producing a motion signal in response to a non-zero difference between the inputs and terminating the motion signal in response to a zero difference between the inputs;
   d. means responsive to the input signal and the measuring circuit for producing a measured compensation signal representing the difference between the desired position of the element and the actual final position of said controlled element; and
   e. means responsive to the measured compensation signal and the previously determined compensation signal and connected to the storage means for producing a new compensation signal and transferring said new compensation signal to the storage means in place of the previously determined compensation signal whereby said new compensation signal becomes the previously determined compensation signal during a subsequent execution of said first input signal.

3. The apparatus of claim 2, wherein the means for producing a measured compensation signal comprises:
   a. means responsive to the input signal and a final output signal representing the final position of the controlled element for producing a first signal representing the magnitude of the difference between the input signal and the final output signal and a second signal representing the sign of said difference magnitude;
   b. means for storing the first and second signals; and
   c. means responsive to the first signal for detecting a zero magnitude.

4. The apparatus of claim 3, wherein the means for producing a new compensation signal comprises means responsive to the first signal, the second signal, and the previously determined compensation signal for algebraically adding the first signal and the previously determined compensation signal to produce a first new compensation signal.

5. The apparatus of claim 4, wherein the means for producing a new compensation signal further comprises:
   a. means responsive to the second signal and the previously determined compensation signal for algebraically summing an incremental magnitude with the previously determined compensation signal to produce a second new compensation signal; and
   b. means responsive to the detecting means and connected to the algebraic summing means for inhibiting the algebraic summing means in response to the first signal having a zero magnitude.

6. The apparatus of claim 5, wherein said apparatus further comprises means for producing an automatic mode signal and a non-automatic mode signal.

7. The apparatus of claim 6, wherein the means for producing a new compensation signal further comprises:
   a. first gating means responsive to the nonautomatic mode signal and the first new compensation signal for transfering the first new compensation signal to the storage means in place of the previously determined compensation signal; and
   b. second gating means responsive to the automatic mode signal and the second new compensation signal for transfering the second new compensation signal to the storage means in place of the previously determined compensation signal.

8. An apparatus for iteratively modifying an input signal representing a change in position of a controlled element as a function of a positioning error generated during a previous occurrence of said input signal, said apparatus being operative with an actuator control circuit for commanding an actuator to move the controlled element through displacements in response to the input signal, said controlled element being connected to a measuring circuit for producing an output signal representing the actual distance traversed by the element, the apparatus comprising:
   a. storage means for storing a previously determined compensation signal;
   b. means responsive to the input signal and the previously determined compensation signal for producing a command signal representing the algebraic sum of the input signal and the previously determined compensation signal;
   c. means having inputs responsive to the command signal and the output signal and having an output in communication with the actuator control circuit for producing a motion signal in response to a nonzero difference between the inputs and producing a stop signal in response to a zero difference between the inputs;
   d. means responsive to the measuring circuit and the storage means for producing a sign signal as a function of the relative magnitude between a final value of the output signal and the input signal;
   e. means responsive to the previously determined compensation signal and the sign signal for modifying the previously determined compensation signal by a predetermined incremental magnitude as a function of the sign signal to produce a new compensation signal; and
   f. gating means responsive to the modifying means and connected to the storage means for transferring the new compensation signal to the storage means in place of the previously determined compensation signal.

9. An apparatus for iteratively compensating input signals representing changes of position of a controlled element as a function of positioning errors generated during previous occurrences of said input signals, said apparatus being operative with an actuator control circuit for commanding an actuator to move the controlled element through cycles of positioning motions in response to the cyclic occurrence of the inputs signals, said controlled element being connected to a measuring circuit for producing an output signal representing the actual position of the controlled elemnt, the apparatus comprising:
   a. an input signal store for storing the input signals;
   b. a compensation signal store for storing active compensation signals corresponding to the input signals, said compensation signal store including means for establishing an initial value for the active compensation signals;
   c. a first adder circuit connected to the input signal store and the compensation signal store for producing a command signal representing the algebraic sum of an input signal and a corresponding active compensation signal;
   d. a comparator connected to the first adder circuit and the measuring circuit for producing a motion signal in response to a nonzero difference between the command signal and an output signal and a stop signal in response to a zero difference between the command signal and the output signal;
   e. a subtraction circuit connected to the input signal store and the measuring circuit for calculating the difference between the input signal and the final value of the output signal to produce a measured compensation signal;
   f. a measured compensation signal store connected to the subtractor circuit for storing the magnitude of the measured compensation signal;
   g. a sign storage circuit connected to the subtractor circuit for storing a sign signal representing the sign of the measured compensation signal;
   h. a zero detection circuit connected to the subtraction circuit for determining a zereo magnitude of the measured compensation signal;
   i. a second adder circuit connected to the measured compensation signal store, the sign store, and the compensation signal store for producing a first new compensation signal as a function of the algebraic sum of the active compensation signal and the measured compensation signal;
   j. a one bit adder-subtracter circuit connected to the sign store, the zero detection circuit and the active compensation store for producing a second new compensation signal by modifying the active compensation signal by a predetermined increment as a function of the sign store, said adder-subtracter circuit being inhibited in its operation in response to a zero magnitude of the measured compensation signal;
   k. a switching circuit for selectively producing an automatic mode signal and a non-automatic mode signal; and
   l. a gating network responsive to the first and second new compensation signals and the switching circuit for selectively loading
      1. the first new compensation signal in the compensation signal store to provide a new value for the active compensation signal in response to the non-automatic mode signal, and
      2. the second new compensation signal in the compensation signal store to provide a new value for the active compensation signal in response to the automatic mode signal.

10. A method for iteratively modifying an input signal representing a change of position of a controlled element as a function of a positioning error generated during a previous occurrence of said input signal, said method causing an actuator control circuit to command an actuator to move the controlled element through positioning motions in response to the cyclic occurrence of the input signal, said controlled element being connected to a measuring circuit for producing an output signal representing the actual position of the controlled element, the method comprising the steps of:
  a. storing an initial compensation signal corresponding to the input signal;
  b. adding the input signal to the stored compensation signal to produce a command signal;
  c. comparing the command signal to the output signal to generate a motion signal in response to a non-zero difference magnitude between the command signal and the output signal;
  d. producing a measured compensation signal representing the difference between the desired position and the actual final position of the controlled element;
  e. changing the stored compensation signal as a function of the measured compensation signal to produce a new compensation signal;
  f. storing the new compensation signal in place of the stored compensation signal; and
  g. iterating steps (b) through (f) for each subsequent occurrence of the input signal.

11. The method according to claim 10, wherein the step of producing a measured compensation signal further comprises the step of:
  a. calculating the difference between the input signal and a final value of the output signal representing the final position achieved by the controlled element and producing a measured compensation signal and a sign signal as a function of the magnitude and sign of the difference, respectively; and
  b. storing the measured compensation signal and the sign signal.

12. The method of claim 11, wherein the step of changing the stored compensation signal further comprises the step of algebraically adding the measured compensation signal to the stored compensation signal to produce the new compensation signal.

13. The method of claim 10, wherein the step of producing a measured compensation signal further comprises:
  a. determining the relative magnitude between the input signal and a final value of the output signal to produce a sign signal;
  b. storing the sign signal; and
  c. detecting a zero difference magnitude between the input signal and the final value of the output signal.

14. The method of claim 13, wherein the step of changing the stored compensation signal further comprises the step of:
  a. adding a predetermined incremental magnitude to the stored compensation signal as a function of the sign signal to produce the new compensation signal; and
  b. inhibiting the addition of the predetermined incremental magnitude in response to a zero difference magnitude between the input signal and the final value of the output signal.

* * * * *